United States Patent
Jordan et al.

(10) Patent No.: US 10,752,276 B1
(45) Date of Patent: Aug. 25, 2020

(54) FRAMED STRUCTURE FOR MATERIAL-HANDLING PURPOSES

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 0 days.

(21) Appl. No.: 16/350,110

(22) Filed: Sep. 26, 2018

(51) Int. Cl.
| | |
|---|---|
| *B62B 5/00* | (2006.01) |
| *A47B 81/00* | (2006.01) |
| *A47B 96/02* | (2006.01) |
| *B62B 3/00* | (2006.01) |
| *B65D 88/54* | (2006.01) |

(52) U.S. Cl.
CPC .............. *B62B 5/00* (2013.01); *A47B 81/007* (2013.01); *A47B 96/02* (2013.01); *B62B 3/002* (2013.01); *B65D 88/546* (2013.01); *B62B 2501/00* (2013.01); *B65D 2519/00* (2013.01); *B65D 2519/00805* (2013.01)

(58) Field of Classification Search
CPC ....... B62B 5/00; B62B 3/002; B62B 2203/20; B62B 2203/28; B62B 2501/00; A47B 55/00; A47B 96/14; A47B 81/007; A47B 96/02; A47B 87/0207; A47B 47/021; A47B 47/028; A47B 87/0215; B65D 19/44; B65D 19/385; B65D 2519/00532; B65D 2588/12; B65D 88/546; B65D 2519/00805; B65D 2519/00; A47F 5/108; A47F 7/28
See application file for complete search history.

(56) References Cited

U.S. PATENT DOCUMENTS

| | | | | | |
|---|---|---|---|---|---|
| 3,294,464 | A | * | 12/1966 | Lew ........................ | A47B 43/02 312/258 |
| 3,795,206 | A | * | 3/1974 | Utz ..................... | B65D 19/0016 108/57.28 |
| 3,911,834 | A | * | 10/1975 | Quaintance ........ | B65D 19/0016 108/51.3 |
| 4,002,126 | A | * | 1/1977 | Bell .................... | B65D 19/0075 108/53.5 |
| 5,287,964 | A | * | 2/1994 | Jacquand ............... | B65D 19/38 206/391 |
| 7,185,911 | B1 | * | 3/2007 | Leverett ................. | B60D 1/481 280/47.371 |

(Continued)

*Primary Examiner* — Hiwot E Tefera
(74) *Attorney, Agent, or Firm* — Michael E. McKee

(57) ABSTRACT

A framed structure, such as a material cart, used for material-handling purposes includes an elongated frame having two opposite ends and two opposite sides. In addition, a first set of mounts are adapted to accept the forks of a forklift truck directed endwise therein and are arranged in such a relationship to the elongated frame so that the first pair of mounts are adapted to accept the forks of a forklift truck directed therein from a side of the elongated frame. Furthermore, a second set of mounts are adapted to accept the forks of a forklift truck directed endwise therein and are arranged in such a relationship to the elongated frame so that the second set of mounts are adapted to accept the forks of a forklift truck directed therein from an end of the elongated frame.

10 Claims, 6 Drawing Sheets

(56) References Cited

U.S. PATENT DOCUMENTS

| | | | | |
|---|---|---|---|---|
| 7,322,586 | B1* | 1/2008 | Zettel | B62B 1/18 280/47.24 |
| 7,866,770 | B2* | 1/2011 | Wu | A47B 47/02 312/257.1 |
| 7,997,441 | B2* | 8/2011 | Marcel | B65D 90/0033 206/386 |
| 9,260,218 | B2* | 2/2016 | Lundius | B65D 19/0095 |
| 9,301,603 | B1* | 4/2016 | Koehn | A47B 43/00 |
| 2008/0135506 | A1* | 6/2008 | Peters | B65D 19/10 211/49.1 |
| 2009/0314673 | A1* | 12/2009 | Richins | B65D 25/10 206/335 |
| 2011/0210023 | A1* | 9/2011 | DeForest | B65D 19/08 206/304.2 |
| 2011/0303129 | A1* | 12/2011 | Harris | B65D 19/08 108/53.1 |
| 2015/0101956 | A1* | 4/2015 | Dobrinski | B65D 19/02 206/591 |
| 2015/0157144 | A1* | 6/2015 | Lamarre | A47B 47/0083 211/135 |
| 2015/0158629 | A1* | 6/2015 | Harris | B65D 19/385 108/53.3 |

* cited by examiner

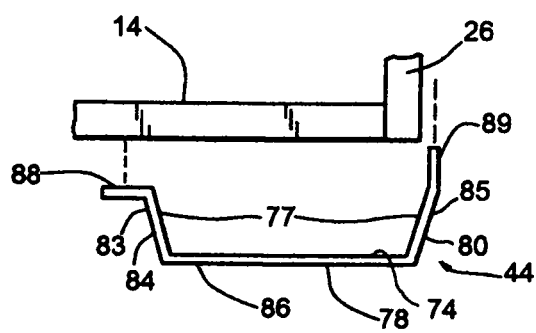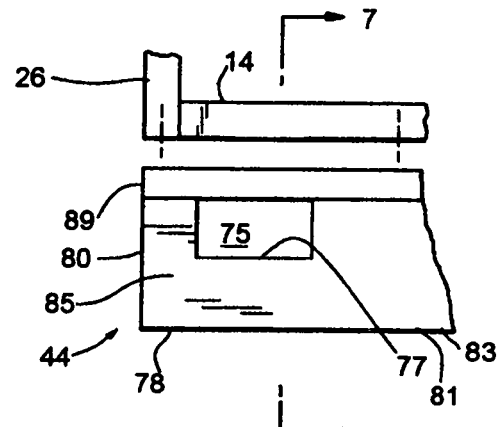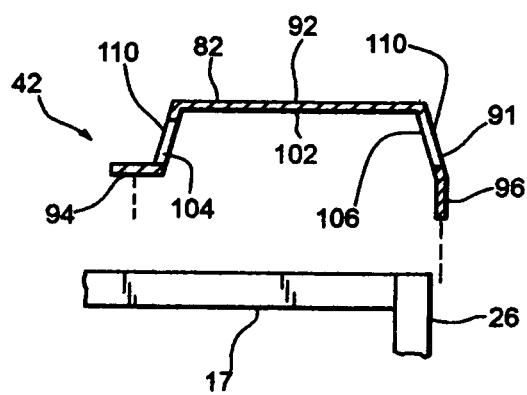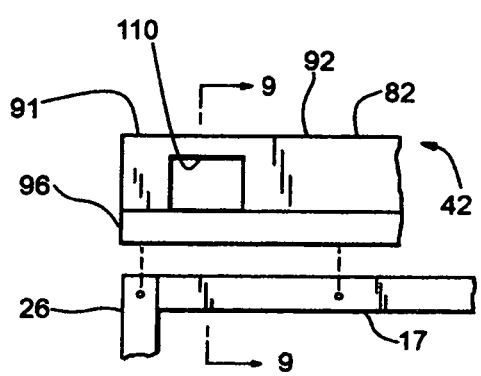

FRAMED STRUCTURE FOR MATERIAL-HANDLING PURPOSES

BACKGROUND OF THE INVENTION

This invention relates generally to material handling accessories and relates, more particularly, to a framed structure within which items can be placed.

The class of framed structures with which this invention is concerned includes those whose frames form a box-like compartment within which items, such as tools or materials, can be placed or form a shelf-including arrangement whose shelves are arranged in a stacked, or superposed, relationship. An example of such a shelf-including arrangement, referred to in the art as a material cart, is shown and described in U.S. Pat. D781,080 whose named inventors are the same as those of the instant application.

It would be desirable to provide a new and improved framed structure which is capable of being lifted for transport with a forklift truck.

Accordingly, it is an object of the present invention to provide a new and improved framed structure of the aforedescribed class which has the capacity to be lifted with the forks of a forklift truck.

Another object of the present invention is to provide such a framed structure which embodies features which enable a forklift truck to engage the structure for lifting purposes whether the truck approaches the framed structure from either a side of the structure or from an end of the structure.

Still another object of the present invention is to provide such a framed structure having fork-accepting mounts arranged adjacent each of the bottom and the top of the framed structure.

Yet another object of the present invention is to provide such a framed structure whose fork-accepting mounts are capable of providing the supporting, for floor-engaging, feet for the structure, whether the structure is oriented in one upright orientation for use or whether the structure is oriented in another, or inverted, orientation for use.

Yet still another object of the present invention is to provide such a framed structure having at least one shelf which provides a tray when the structure is oriented in one upright orientation and which provides a broad, lipless surface when the framed structure is turned upside down to another, or inverted, orientation.

A further object of the present invention is to provide such a framed structure which is uncomplicated in structure, yet effective in operation.

A still further object of the present invention is to provide a framed structure having an interior which is convertable between a condition at which the structure provides a box-like compartment within which items, such as tools or materials, can be placed for storage or transport and a condition at which the structure provides at least one shelf upon which items, such as tools or materials can be placed or at least one wire rack upon which spools of wire can be placed.

A yet further object of the present invention is to provide such a framed structure which is provided with side panels and end panels for substantially enclosing the interior of the framed structure.

One more object of the present invention is to provide such a framed structure whose side or end panels are capable of movement between opened and closed conditions.

SUMMARY OF THE INVENTION

This invention resides in a framed structure for material-handling purposes.

The framed structure includes an elongated frame having two opposite ends and two opposite sides. In addition, the structure includes a first set of mounts connected to the elongated frame and which are adapted to accept the forks of a forklift truck directed endwise therein wherein the first set of mounts includes a first pair of mounts which are arranged in such a relationship to the elongated frame so that the first pair of mounts are adapted to accept the forks of a forklift truck directed therein from a side of the elongated frame. Furthermore, the structure includes a second set of mounts connected to the elongated frame and which are adapted to accept the forks of a forklift truck directed endwise therein wherein the second pair of mounts are arranged in such a relationship to the elongated frame so that the second set of mounts are adapted to accept the forks of a forklift truck directed therein from an end of the elongated frame.

BRIEF DESCRIPTION OF THE DRAWINGS

FIG. 6 is an end elevation view of a fragment of the FIG. 1 cart as shown in FIG. 2 but drawn to a slightly larger scale and shown exploded.

FIG. 7 is a cross-sectional view of the FIG. 6 fragment taken along line 7-7 of FIG. 6.

FIG. 8 is an end elevation view of a fragment of the FIG. 1 cart as shown in FIG. 3 but drawn to a slightly larger scale and shown exploded.

FIG. 9 is a cross-sectional view of the FIG. 8 fragment taken about along line 9-9 of FIG. 8.

DETAILED DESCRIPTION OF AN ILLUSTRATIVE EMBODIMENT

Figure 1:
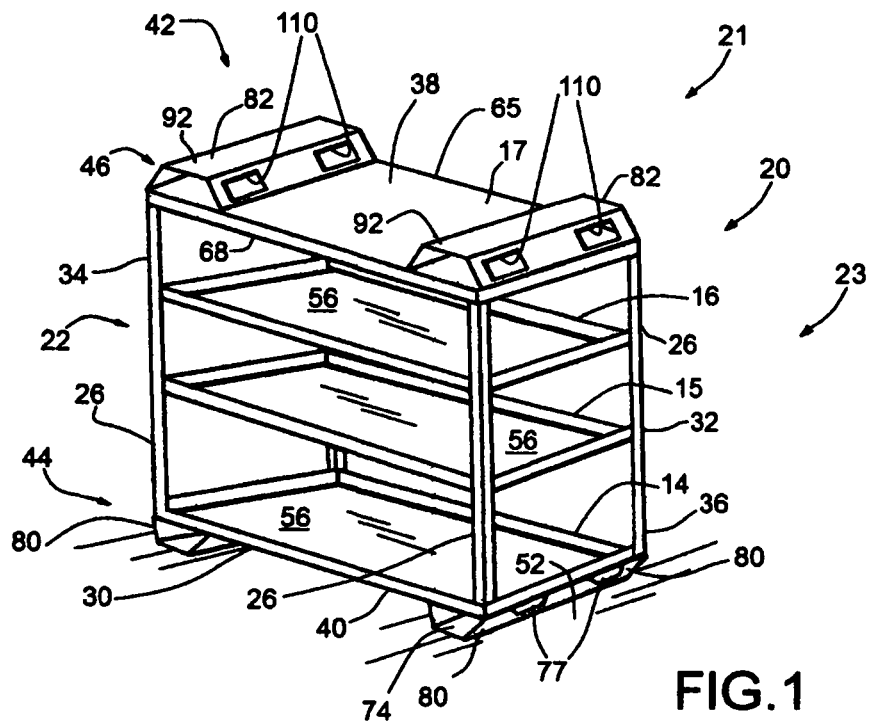
FIG. 1 is a perspective view of a material cart within which features of the present invention are embodied.

Turning now to the drawings in greater detail and considering first FIG. 1, there is illustrated an embodiment, generally indicated 21, of a framed structure within which features of the present invention are embodied. Briefly, the framed structure 21 includes a frame, generally indicated 23, which provides the structure 21 with two opposite and parallel ends, two opposite and parallel sides, a top and a bottom. The framed structure 21 of FIG. 1 is in the form of a material cart, generally indicated 20, whose frame 23 includes means, generally indicated 22, for providing a plurality of (i.e. four) item-supporting shelves 14, 15, 16, 17 and corner posts 26 for supporting the shelves 14, 15, 15, 16 in a substantially superposed, or vertically-stacked, relationship. As best shown in FIG. 1, frame 23 of the material cart 20 is in the form of a rectangular prism (or box-like configuration) whose opposite sides provide two opposite sides 30, 32 of the cart 20 and whose opposite ends provide two opposite ends 34, 36 of the cart 20. Moreover and with respect to the upright orientation of the cart 20 as viewed in FIG. 1, the cart 20 has a top, designated 38, and an opposite bottom, designated 40.

Figure 10:
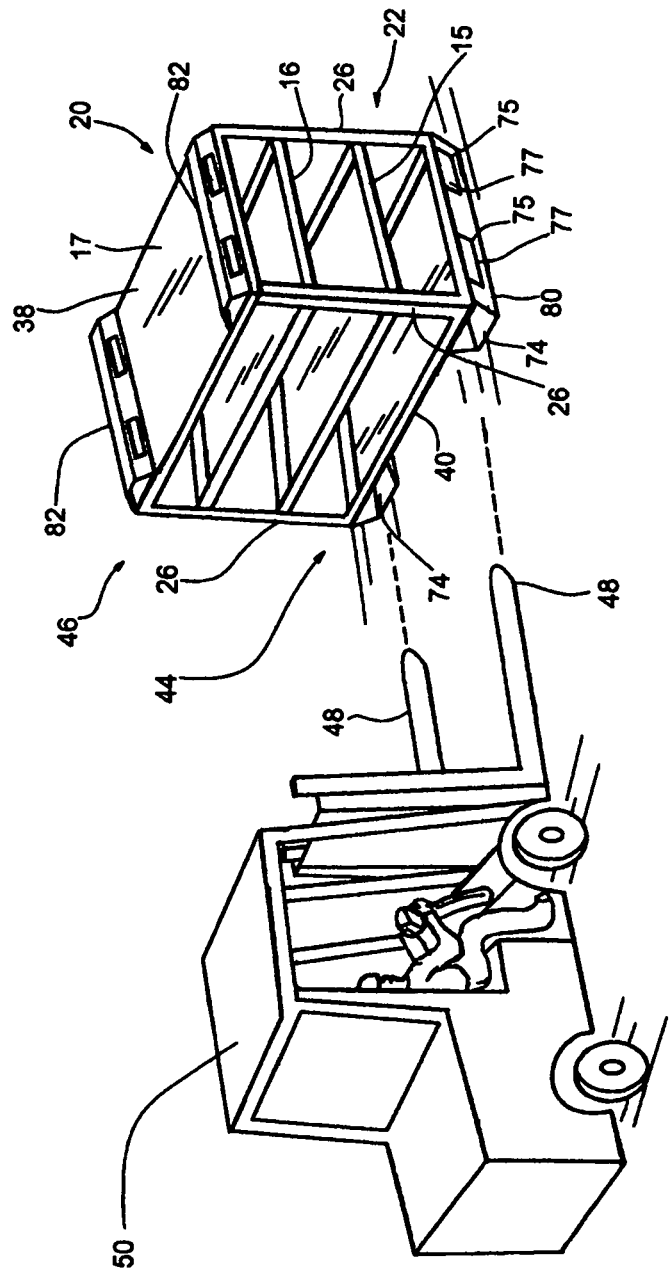
FIG. 10 is a perspective view of the FIG. 1 cart and a forklift truck approaching the cart from one side thereof.
Figure 11:
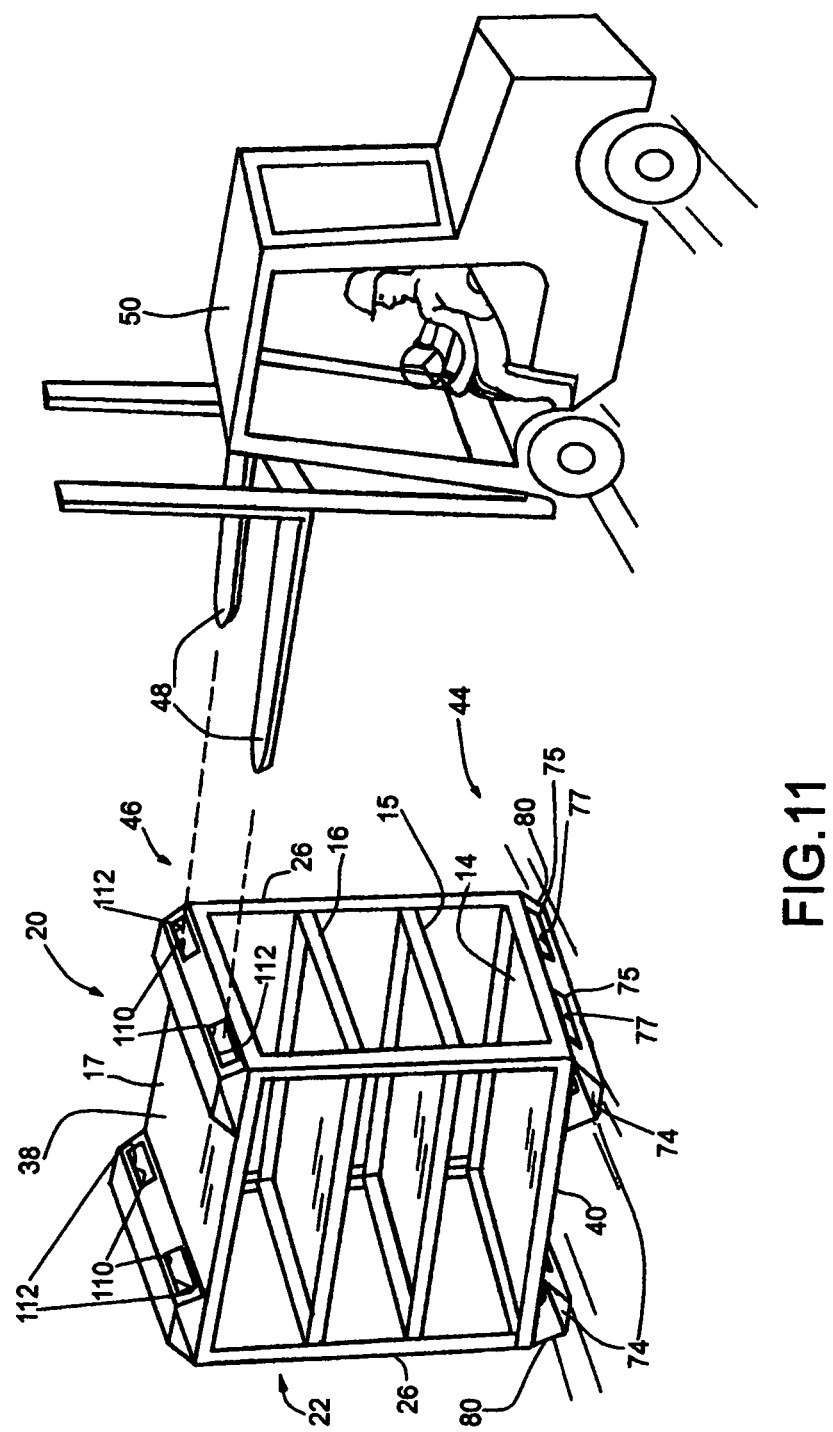
FIG. 11 is a perspective view of the FIG. 1 cart and a forklift truck approaching the cart from one end thereof.

The cart 20 also includes means, generally indicated 42, for providing two sets, indicated 44 and 46, of mounts adapted to receive the forks 48 (FIGS. 10 and 11) of a forklift truck 50 directed endwise therein for purposes of lifting and transporting the cart 20 (by way of the truck 50) to an alternative location. As will be apparent herein, the sets 44, 46 of forklift-accepting mounts are disposed at locations relative to the remainder of the cart 20 to enable the cart 20 to be lifted from the underlying floor 52 whether the cart 20 is approached by a forklift truck 50 from a side of the cart 20 or from an end of the cart 20. In addition, at least one shelf 14, 15, 16, 17 of the shelf-providing means 22 is configured to provide one class, or style, of shelf when the cart 20 is oriented in one, or a predetermined, upright orientation and to provide another class, or style, of shelf when the cart 20 is oriented in another, or inverted, upright orientation.

Figure 2:
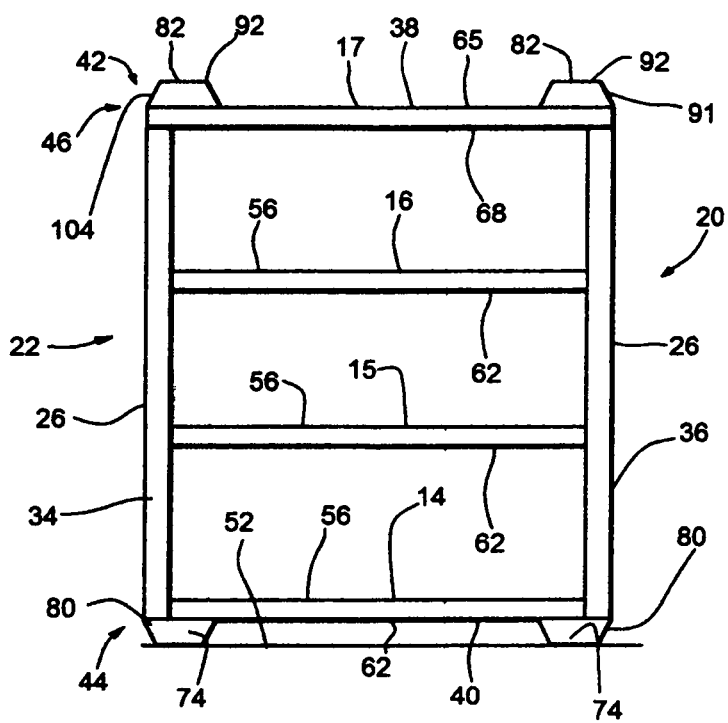
FIG. 2 is a side elevation view of the material cart of FIG. 1 as seen generally from the left in FIG. 1.
Figure 3:
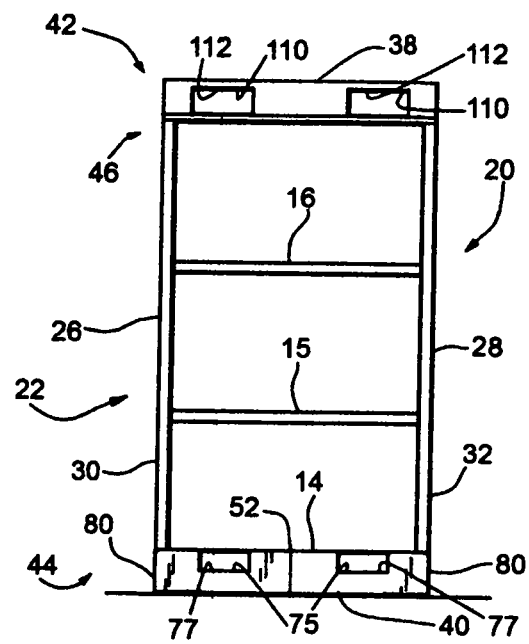
FIG. 3 is an end elevation view of the material cart of FIG. 1 as seen generally from the right in FIG. 1.
Figure 4:
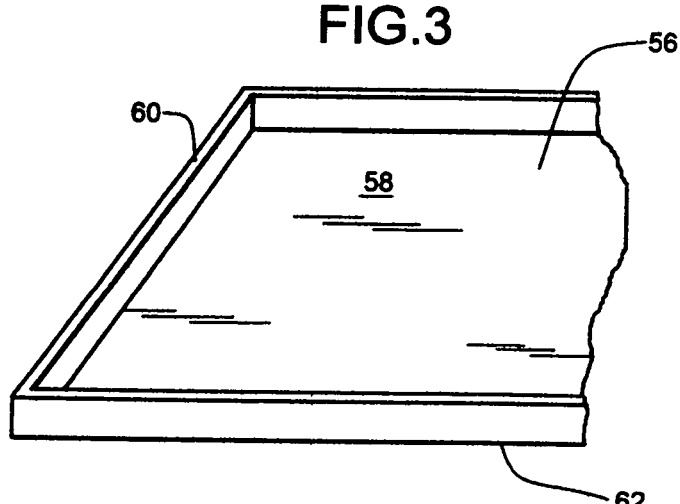
FIG. 4 is an elevation view of a fragment of one of the shelves of the FIG. 1 cart when the cart is arranged in the upright orientation as shown in FIG. 1.
Figure 5:
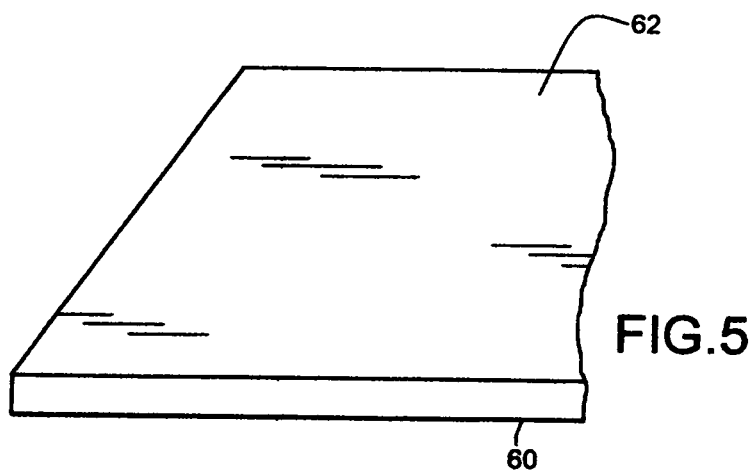
FIG. 5 is an elevation view of a fragment of the shelf depicted in FIG. 4 when the cart is arranged in an inverted orientation from the orientation shown in FIG. 1.

More specifically and with reference to FIGS. 1-4, of the four shelves 14, 15, 16, 17 of the shelf-providing means 22, there exists three shelves 14, 15, 16 which comprise the lower three shelves of the cart 20 and one shelf 17 which comprises the uppermost shelf of the cart 20. Each of the lower shelves 14, 15, 16 is in the form of an (upwardly-opening) item-supporting tray 56 having a substantially rectangular bottom section 58 and a lip, or flange, 60 which is joined to the bottom section 58 along the edges thereof so as to extend upwardly therefrom (when the cart 20 is viewed in its upright orientation as viewed in FIGS. 1-3). By comparison, the underside of the bottom section 58 of the tray 56 provides a surface 62 which is planar and lipless (i.e. possesses no flange along the edge thereof). It therefore follows that when the cart 20 is arranged in its upright orientation as depicted in FIGS. 1-3, each of the three lower shelves 14, 15, 16 functions as an upwardly-facing tray within which appropriately-sized items (e.g. tools and supplies) can be placed and thereafter prevented from inadvertently falling or rolling off of an edge of the shelf 14, 15 or 16 by the upturned lip 60. However and if the cart 20 is turned upside down to an alternative, or inverted, orientation from the orientation as shown in FIGS. 1-3, so that the underside 62 of each shelf 14, 15 or 16 faces upwardly (as exemplified by the inverted shelf 14 shown in FIG. 5), the underside 62 provides a relatively broad and upwardly-facing lipless surface upon which items can be placed. Such a lipless surface 62 (when facing upwardly) might be preferred by a user over the tray-providing side of the shelf 14, 15 or 16 in an instance in which it is desired that the item (such as a lengthy board or pipe) desired to be placed upon the surface 62 is permitted to overlap the edge thereof and not be interfered with by an upturned lip.

Meanwhile and with reference again to FIGS. 1-3, the uppermost shelf 17 is provided with an upwardly-facing lipless surface 65 and a planar underside which is bordered by a downwardly-extending lip 68. Therefore and when the cart 20 is arranged in its upright orientation as depicted in FIGS. 1-3, the lipless surface 65 of the shelf 17 faces upwardly; and when the cart 20 is turned upside down to an inverted condition, the lipped underside surface 66 of the shelf 17 provides an upwardly-opening tray within which an appropriately-sized items can be placed.

With reference still to FIGS. 1-3, the shelves 14, 15, 16, 17 are supported in the depicted stacked arrangement by way of four corner posts 26, introduced earlier, which are each joined, as by welding, to each of the shelves 14, 15, 16, 17 at the corners thereof. Preferably, each corner post 26 is L-shaped in cross section so that the leg of each L of the L-shaped cross section flatly engages the outer surfaces of the lips 60 and 68 of the shelves 14, 15, 16 and 17 as the post 26 extends between the top 38 and bottom 40 of the cart 20.

The shelves 24 and corner posts 70 are preferably constructed of metal, such as steel, but other materials can be used.

It is a feature of the material cart 20 that one, or a first, set 44 of forklift-accepting mounts are arranged adjacent the bottom 40 of the cart 20 and that the other, or second, set 46 of forklift-accepting mounts are arranged adjacent the top 38 of the cart 20. In this connection and with reference to FIGS. 3, 6 and 7, the set 44 includes two identically-shaped mounts 80 which are each provided by a pair of lengthy pieces 81 of material (e.g. sheet material) which are each formed to provide an elongated region 83 of substantially U-shaped cross section and attachment flanges 88 and 89. Each substantially U-shaped region 83 possesses a base 86 and a pair of legs 84, 85 which extend away from the base 86. One attachment flange 88 is joined to the end of the leg 84 opposite the base 86 so as to extend along the length thereof for attachment (e.g. as with welds) to the underside of the lowermost shelf 14, and the other flange 89 is joined to the end of the leg 85 opposite the base 86 and is secured (e.g. welded) to the lowermost shelf 14 along a corresponding end 34 o 36 of the cart 20.

The U-shaped major region 83 provides, with the underside surface of the lowermost shelf 14, openings 74 which are open at the opposite ends of the region 83 for accepting the fork of a pair of forks 48 of a forklift truck 50 which approaches the cart 20 from a side (i.e. either side 30 or 32) of the cart 20. In addition, each mount 80 of the first set 44 of mounts is provided with a pair of aligned cutouts 75 which extend through the sides (i.e. the legs 84, 85) of the U-shaped region 83 for accepting a fork of a pair of forks 48 of a forklift truck 50 which approaches the cart 20 from an end (either end 34 or 36) of the cart 20. Accordingly, the two openings, indicated 77 in FIG. 6, provided by the pair of aligned cutouts 75 of each mount 80 are spaced from one another to simultaneously accept the pair of forks 48 of a forklift truck 50 directed endwise therein. Furthermore, one opening 77 provided by one pair of aligned cutouts 75 are substantially aligned with the opening 77 provided by one pair of aligned openings 75 of the other mount 80 so that a single face 48 of a forklift truck 50 can be accepted by the two aligned openings 77 of both mounts 80. Further still, the spacing which exists between the two openings 77 of one mount 80 is sized to permit the two openings 77 to simultaneously accept the two forks of a forklift truck 50 directed endwise therein.

Similarly and with reference to FIGS. 2, 8 and 9, the other set 46 of forklift-accepting mounts 82 are provided by a pair of lengthy pieces 91 of material (e.g. sheet metal) which are each formed to provide an elongated region 92 of substantially U-shaped cross section and attachment flanges 94 and 96. Each substantially U-shaped region 92 possesses a base 102 and a pair of legs 104, 106 which extend away from the base 102. One attachment flange 94 is joined to the end of the leg 104 opposite the base 102 so as to extend along the length thereof for attachment (e.g. with welds) to the upper surface of the uppermost shelf 17, and the other attachment flange 96 is joined to the end of the leg 106 opposite the base 102 so as to extend along the length thereof for attachment (e.g. with welds) along a corresponding end of the uppermost shelf 17. Thus and as best shown in FIG. 2, one mount 82 of the set 46 is positioned adjacent one end surface of the uppermost shelf 17 while the other mount 82 of the set 46 is positioned adjacent the other, or opposite, end surface of the uppermost shelf 17. Further still, the length of the U-shaped region 92 of each mount 80 is substantially equal to the width of the uppermost shelf 17.

Like the mounts 80 of the first set 44 of mounts, whose U-shaped major region 78 provides, with the underside surface of the shelf 14, openings 74 which are open at the opposite ends of the region 78 for accepting the fork of a pair of forks 48 of a forklift truck 50 which approaches the cart 20 from a side (i.e. either side 30 or 32) of the cart 20, the mounts 82 of the second set 48 of mounts are provided with a pair of aligned cutouts 110 which extend through the sides (i.e. legs 104, 106) of the U-shaped region 92 for accepting the forks of a pair of forks 48 of a forklift truck 50 which approaches the cart 20 from an end (i.e. either end 34 or 36) of the cart 20. Accordingly, the two openings, indicated 112 in FIG. 3, provided by the pair of aligned cutouts 110 of each mount 82 are spaced to simultaneously accept the pair of forks 48 of a forklift truck 50 directed endwise therein. Furthermore, one opening 112 provided by one pair of aligned cutouts 110 of one mount 82 is substantially aligned with the opening 112 provided by one pair of aligned cutouts 110 of the other mount 82 so that a single fork 48 of a forklift truck 50 can be accepted by the two aligned openings 112 of both mounts 82. Furthermore, the spacing which exists between the two openings 112 of one mount 82 is sized to permit the two openings 112 to simultaneously accept the two forks 48 of a forklift truck 50 directed endwise therein.

It follows from the foregoing that the material cart 20 can be lifted by way of the mounts 80 of the first set 44 of mounts or by way of the mounts 82 of the second set 46 of mounts as the pair of forks 48 of a forklift truck 50 are directed endwise into the aligned openings 74 of the mounts 80 which open out of a side (i.e. either side 30 or 32) of the cart 20, and the material cart 20 can be alternatively lifted by way of the mounts 80 of the first set of mounts 44 or by way of the mounts 82 of the second set of mounts 46 as the forks 48 of a forklift truck 50 are directed endwise through the aligned openings 77 provided in the U-shaped regions 81 of the first pair of mounts 80 or through the aligned openings 112 provided in the U-shaped regions 92 of the second pair of mounts 82.

As has been described above, each of the shelves 14, 15, 16 or 17 of the shelf-providing means 22 has been formed to provide, on one side, a tray, and each of the shelves 14, 15, 16 or 17 of the shelf-providing means 22 has been formed to provide, on the opposite side, a planar surface 62 in FIG. 1, having no lip along the edges thereof. Thus, the material cart 20 is capable of being used in the depicted FIG. 1 orientation at which the lowermost shelves 14, 15, 16 are oriented tray-side up and the uppermost shelf 17 is oriented planar surface 62-side up. By comparison, the material cart 20 is capable of being turned upside down to an inverted condition with respect to the orientation depicted in FIG. 1 at which the shelves 14, 15, 16 are oriented planar surface 62-side up and the shelf 17 is oriented tray-side up. It will also be understood that while the mounts 80 of the first set 44 of mounts provide the floor-engaging feet of the cart 20 when the cart 20 is oriented in its upright, FIG. 1 orientation, the mounts 82 of the second set 46 of mounts provide floor-engaging feet of the cart 20 when the cart 20 is arranged in an inverted orientation with respect to that orientation depicted in FIG. 1.

Exemplary dimensions of the depicted material cart 20 are provided here as follows: The height of the material cart 20 as measured between the top 38 and the bottom 40 thereof is about fifty-nine inches, the width of the cart 20 as measured between the sides 30, 32 thereof is about twenty-seven inches, and the length of the cart 70 as measured between the ends 34, 36 is about 56.5 inches.

It will be understood that numerous modifications and substitutions can be had to the aforedescribed embodiment 20 without departing from the spirit of the invention. For example and in connection with the aforedescribed material cart 20 of FIGS. 1-11, a set of wheeled casters (not shown) could be attached beneath the mounts 80 of the first set of mounts to enable the cart 20 to be wheeled across the underlying floor 52.

Figure 12:
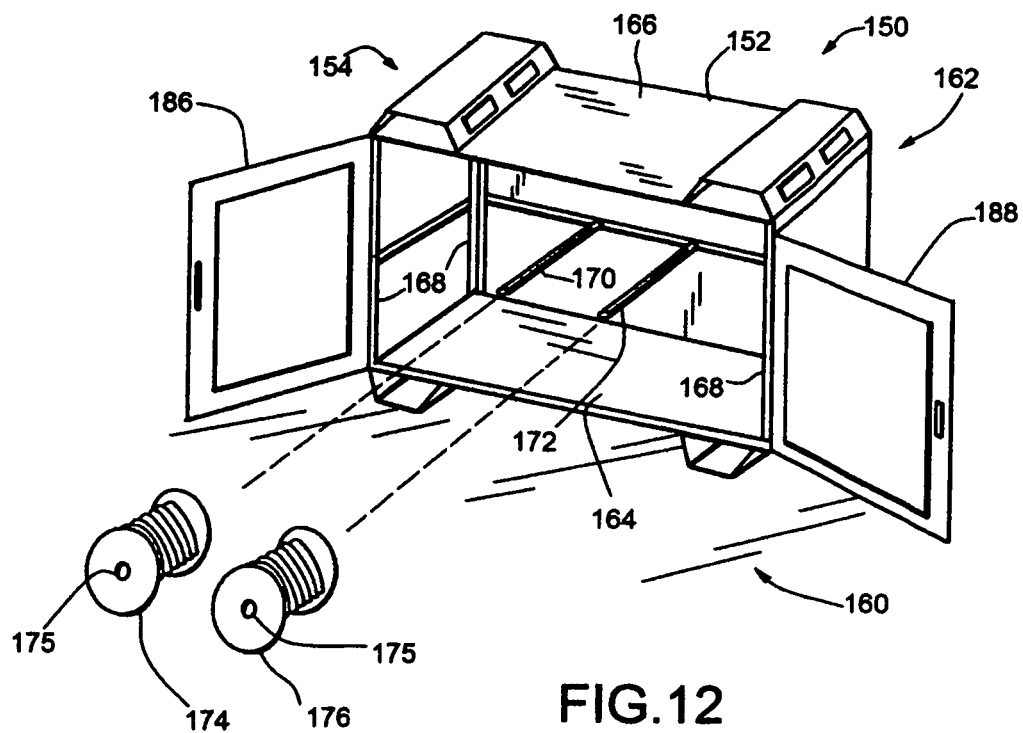
FIG. 12 is a perspective view of an alternative framed structure within which features of the present invention are embodied.

Further still and although the aforedescribed material cart 20 of FIGS. 1-11 has been shown and described as including a frame 23 having an interior which includes a plurality of vertically-stacked shelves 14, 15, 16 and 17, such an interior of a framed structure in accordance with the present invention could be devoid of such shelves. For example, there is depicted in FIG. 12 a perspective view of a framed structure, generally indicated 150, in the form of a storage cabinet 152 having a frame, generally indicated 154, and first and second sets 160 and 162, respectively, of fork-accepting mounts attached to the bottom and top, respectively, of the structure 150. Within the depicted structure 150, the frame 154 includes a bottom, or floor, panel 164, a top panel 166 and vertically-oriented corner posts 168 arranged at the four corners of the structure 150. Mounted within the interior of the frame 154 is a pair of substantially horizontally-oriented posts 170, 172 which are joined at one end to a suitable arrangement of braces and struts for the purpose of supporting spools 174, 176 of wire whose spools have opening-defining cores 175 capable of being directed over the free ends of the posts 170, 172. Furthermore, the interior of the frame 154 can be substantially enclosed with appropriately-sized side and end panels and a pair of hinged (and lockable) doors 186, 188 for providing a user with access to the interior of the structure 150.

Figure 13:
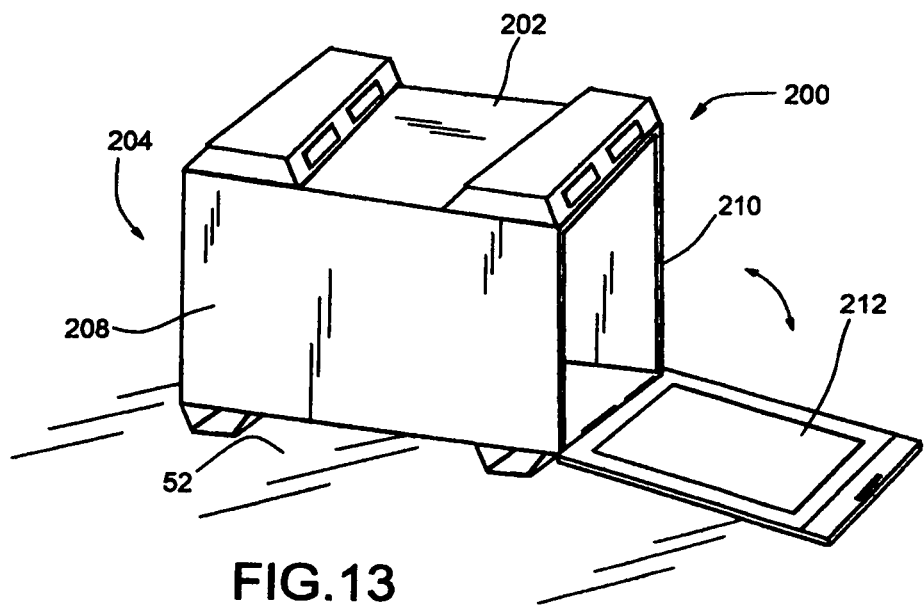
FIG. 13 is a perspective view of another alternative embodiment of a framed structure within which features of the present invention are embodied.

Further still, a framed structure which embodies features of the present invention could possess a hinged panel at one end thereof for providing a ramp which facilitates the movement of items into or out of the interior of the structure. For example, there is illustrated in FIG. 13 a framed structure, generally indicated 200, in the form of a storage cabinet 202 having a frame 204 whose interior is substantially enclosed with appropriately-sized panels and which possesses (at least one) end panel 212 which is hingedly joined to the remainder of the frame 204 adjacent a bottom edge thereof for movement between a closed condition at which the interior of the frame 204 is substantially enclosed and an opened condition (as shown in FIG. 13) at which the end panel 212 provides a ramp. It has been found that the framed structure 200 is well-suited for use as a job box into which tools and materials can be placed for storage and/or transport or, when desired, locked up for security purposes.

Accordingly, the aforedescribed embodiments are intended for the purpose of illustration and not as limitation.

The invention claimed is:
1. A framed structure for material-handling purposes, the framed structure comprising:

an elongated frame having two opposite ends, two opposite sides, a top and a bottom;
a first set of mounts connected to the elongated frame and which are adapted to accept the forks of a forklift truck directed endwise therein wherein the first set of mounts includes a first pair of elongated bodies wherein each elongated body of the first pair of elongated bodies has two opposite ends and has a major section which extends between the two opposite ends of the body which is of substantially U-shaped cross section having two legs and a base which joins the two legs, and wherein each elongated body of the first pair of elongated bodies defines a fork-accepting opening at each of its two opposite ends and an uninterrupted fork-accepting passageway which extends between the openings defined at the two opposite ends of each elongated body of the first pair, is joined to the elongated frame by way the legs of the U-shaped cross-section and is arranged alongside the other elongated body of the first pair of elongated bodies so that the fork-accepting openings of the first pair of elongated bodies are adapted to accept the forks of a forklift truck directed therein from either side of the elongated frame;
wherein the major section of each elongated body of the first set of mounts includes a pair of through-openings extending through the legs of the major section of substantially U-shaped cross section, and the pair of through-openings of the major section of each elongated body of the first set of mounts are adapted to accept a pair of forks of a forklift truck directed endwise therein from either end of the elongated frame; and
a second set of mounts connected to the elongated frame and which are adapted to accept the forks of a forklift truck directed endwise therein wherein the second set of mounts includes a second pair of elongated bodies wherein each elongated body of the second pair of elongated bodies has two opposite ends and has a major section which extends between the two opposite ends of the body which is of substantially U-shaped cross section having two legs and a base which joins the two legs, and wherein each elongated body of the second pair of elongated bodies defines a fork-accepting opening at each of its two opposite ends and an uninterrupted fork-accepting passageway which extends between the openings defined at the two opposite ends of each elongated body of the second pair, is joined to the elongated frame by way of the legs of the U-shaped cross section and is arranged alongside the other elongated body of the second pair of elongated bodies so that the fork-accepting openings of the second pair of elongated bodies are adapted to accept the forks of a forklift truck directed therein from either side of the elongated frame; and
wherein the major section of each elongated body of the second set of mounts includes a pair of through-openings extending through the legs of the major section of substantially U-shaped cross section, and the pair of through-openings of the major section of each elongated body of the second set of mounts are adapted to accept a pair of forks of a forklift truck directed endwise therein from either end of the elongated frame; and
wherein the first set of mounts are fixed to one of the top and the bottom of the frame and the second set of mounts are fixed to the other of the top and the bottom of the frame.

2. A framed structure for material-handling purposes, the framed structure comprising:
an elongated frame of substantially rectangular configuration having two opposite and parallel ends and two opposite and parallel sides, and wherein the frame includes a top and a bottom;
a first set of mounts connected to the elongated frame and which are adapted to accept the forks of a forklift truck directed endwise therein wherein the first set of mounts includes a first pair of elongated bodies wherein each elongated body of the first pair of elongated bodies has two opposite ends and has a major section which extends between the two opposite ends of the body which is of substantially U-shaped cross section having two legs and a base which joins the two legs, and wherein each elongated body of the first pair of elongated bodies defines a fork-accepting opening at each of its two opposite ends and an uninterrupted fork-accepting passageway which extends between the openings defined at the two opposite ends of each elongated body of the first pair, is joined to the elongated frame by way of the legs of the U-shaped cross-section and is arranged alongside the other elongated body of the first pair of elongated bodies so that the fork-accepting openings of the first pair of elongated bodies are adapted to accept the forks of a forklift truck directed therein from either one of the two sides of the elongated frame;
wherein the major section of each elongated body of the first set of mounts includes a pair of through-openings extending through the legs of the major section of substantially U-shaped cross section, and the pair of through-openings of the major section of each elongated body of the first set of mounts are adapted to accept a pair of forks of a forklift truck directed endwise therein from an end of the elongated frame; and
a second set of mounts connected to the elongated frame and which are adapted to accept the forks of a forklift truck directed endwise therein wherein the second set of mounts includes a second pair of elongated bodies wherein each elongated body of the second pair of elongated bodies has two opposite ends and has a major section which extends between the two opposite ends of the body which is of substantially U-shaped cross section having two legs and a base which joins the two legs, and wherein each elongated body of the second pair of elongated bodies defines a fork-accepting opening at each of its two opposite ends and an uninterrupted fork-accepting passageway which extends between the openings defined at the two opposite ends of each elongated body of the second pair, is joined to the elongated frame by way of the legs of the U-shaped cross section and is arranged alongside the other elongated body of the second pair of elongated bodies so that the fork-accepting openings of the second pair of elongated bodies are adapted to accept the forks of a forklift truck directed therein from either one of the two sides of the elongated frame; and
wherein the major section of each elongated body of the second set of mounts includes a pair of through-openings extending through the legs of the major section of substantially U-shaped cross section, and the pair of through-openings of the major section of each elongated body of the second set of mounts are adapted to accept a pair of forks of a forklift truck directed endwise therein from an end of the elongated frame; and wherein the first set of mounts are fixed to one of the top and the bottom of the frame and the second set of mounts are fixed to the other of the top and the bottom of the frame.

3. The framed structure as defined in claim 2 wherein said one of the first and second set of mounts provides floor-engaging feet for the framed structure when the framed structure is arranged upon an underlying floor in one upright orientation, and said other of the first and second set of mounts provides floor-engaging feet for the framed structure when the framed structure is arranged upon an underlying floor in an inverted orientation with respect to said one upright orientation.

4. The framed structure as defined in claim 2 wherein the elongated frame of the structure has an interior, and the structure includes a plurality of shelves arranged within the interior of the frame in a stacked relationship.

5. The framed structure as defined in claim 4 wherein at least one shelf of the plurality of shelves is in the form of a tray having a bottom surface and a lip extending around the edges of the bottom surface, and the support tray defines an underside which is lipless.

6. The framed structure as defined in claim 2 wherein the elongated frame of the structure has an interior, and the structure includes at least one post supported within the frame interior for holding a roll of wire having an opening-defining core directed over an end of the post.

7. The framed structure as defined in claim 2 wherein the elongated frame of the structure has an interior, and the structure includes panels for substantially enclosing the interior of the frame, and at least one of the panels is hingedly joined to the frame for providing access to the frame interior.

8. The framed structure as defined in claim 7 wherein at least one panel of the structure is hingedly connected to the remainder of the frame for pivotal movement relative thereto about an axis disposed adjacent the bottom of the structure between a closed condition at which the at least one panel helps to enclose the frame interior and an opened condition at which the at least one panel provides a ramp leading to and from the frame interior.

9. A material cart having a top and a bottom and including shelf-providing means defining a plurality of shelves arranged in a stacked relationship and wherein the shelves provide the cart with two opposite ends and two opposite sides which extend between the opposite ends, the improvement comprising:

a first set of mounts connected to the shelf-providing means and which are adapted to accept the forks of a forklift truck directed endwise therein wherein the first set of mounts includes a first pair of elongated bodies wherein each elongated body of the first pair of elongated bodies has two opposite ends and has a major section which extends between the two opposite ends of the body which is substantially U-shaped cross section having two legs and a base which joins the two legs, and wherein each elongated body of the first pair of elongated bodies defines a fork-accepting opening at each of its two opposite ends and an uninterrupted fork-accepting passageway which extends between the openings defined at the two opposite ends of each elongated body of the first pair, is joined to the shelf-providing means by way of the legs of the U-shaped cross section and is arranged alongside the other elongated body of the first pair of elongated bodies so that the fork-accepting openings of the first pair of elongated bodies are adapted to accept the forks of a forklift truck directed therein from either one of the two sides of the material cart;

wherein the major section of each elongated body of the first set of mounts includes a pair of through-openings extending through the legs of the major section of substantially U-shaped cross section, and the pair of through-openings of the major section of each elongated body of the first set of mounts are adapted to accept a pair of forks of a forklift truck directed endwise therein from either end of the material cart; and a second set of mounts connected to the shelf-providing means and which are adapted to accept the forks of a forklift truck directed endwise therein wherein the second pair of mounts includes a second pair of elongated bodies wherein each elongated body of the second pair of elongated bodies has two opposite ends and has a major section which extends between the two opposite ends of the body which is of substantially U-shaped cross section having two legs and a base which joins the two legs, and wherein each elongated body of the second pair of elongated bodies defines a fork-accepting opening at each of its two opposite ends and an uninterrupted fork-accepting passageway which extends between the openings defined at the two opposite ends of each elongated body of the second pair, is joined to the shelf-providing means by way of the legs of the U-shaped cross section and is arranged alongside the other elongated body of the second set of elongated bodies so that the fork-accepting openings of the second pair of elongated bodies are adapted to accept the forks of a forklift truck directed therein from either one of the two sides of the material cart; and wherein the major section of each elongated body of the second set of mounts includes a pair of through-openings extending through the legs of the major section of substantially U-shaped cross section, and the pair of through-openings of the major section of each elongated body of the second set of mounts are adapted to accept a pair of forks of a forklift truck directed endwise therein from either end of the material cart; and wherein one of the first set of mounts is fixed to the top of the cart, and the other of the first and second set of mounts is fixed to the top of the cart.

10. The material cart as defined in claim 9 wherein the shelf-providing means includes a lowermost shelf disposed adjacent the bottom of the cart and an uppermost shelf disposed adjacent the top of the cart, and one of the first and second set of mounts is secured to the lowermost shelf and the other of the first and second set of mounts is secured to the uppermost shelf.

* * * * *